(No Model.)

E. H. CONDIT.
HORSE POWER.

No. 491,528. Patented Feb. 14, 1893.

Witnesses
Harry L. Ames.
D. P. Wolhaupter

Inventor
Emmet H. Condit.
By his Attorneys,
C. A. Snow & Co.

UNITED STATES PATENT OFFICE.

EMMETT H. CONDIT, OF OUTVILLE, OHIO.

HORSE-POWER.

SPECIFICATION forming part of Letters Patent No. 491,528, dated February 14, 1893.

Application filed September 30, 1892. Serial No. 447,394. (No model.)

*To all whom it may concern:*

Be it known that I, EMMETT H. CONDIT, a citizen of the United States, residing at Outville, in the county of Licking and State of Ohio, have invented a new and useful Horse-Power, of which the following is a specification.

This invention relates to horse powers; and it has for its object to provide an improvement in machines of this character which are especially adapted for use in connection with hay elevating and analogous devices.

To this end the invention primarily contemplates an improved power wherein the backing of the draft animals is dispensed with, and a construction provided which automatically releases the winding drum or wheel of the power at the very moment that the animal or animals stop, and which also is put automatically in operation when the draft is again applied.

With these and other objects in view which will be apparent to those skilled in the art as the nature of the invention is better understood, the same consists in the novel construction, combination and arrangement of parts as will be hereinafter more fully described, illustrated and claimed.

Figure 1:
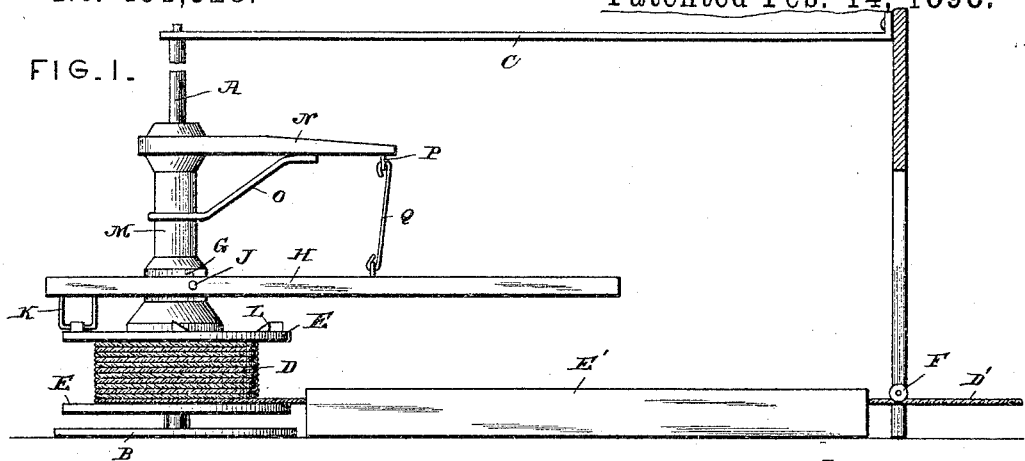
Figure 2:
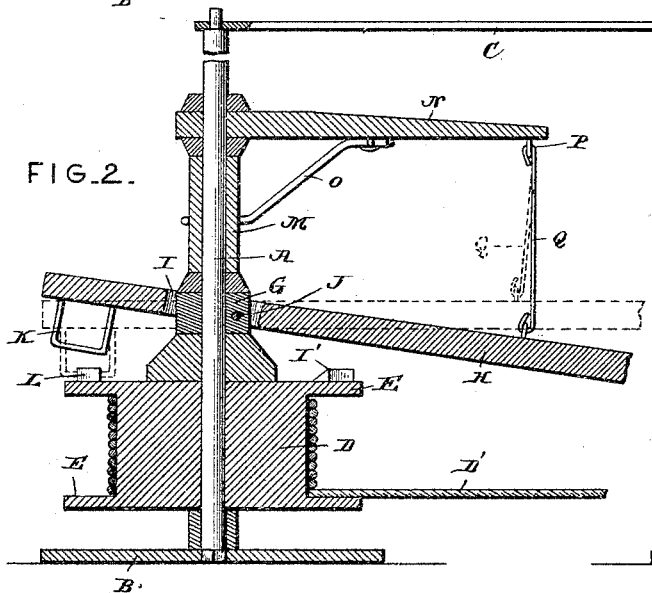
Figure 3:
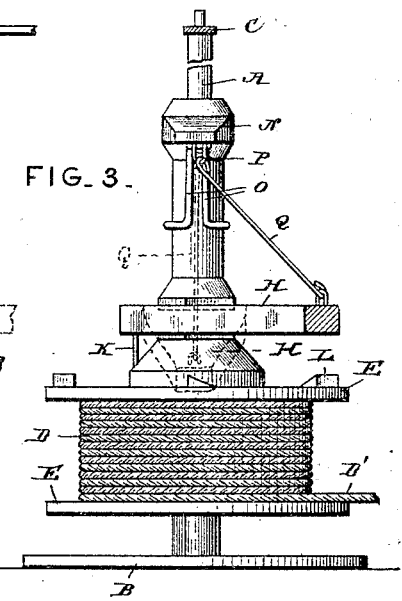
Figure 4:
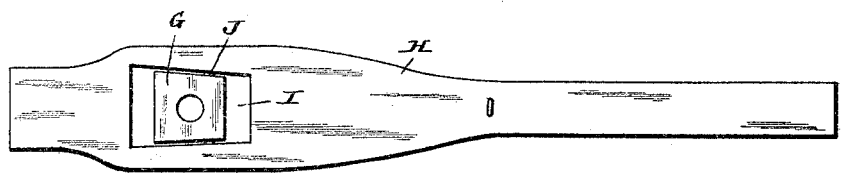

In the drawings:—Figure 1 is a front elevation of a horse power constructed in accordance with this invention, showing one side of the barn in which the same is employed. Fig. 2 is a vertical sectional view of the same illustrating the pivoted sweep lever out of engagement with the wheel or drum in full lines, and in engagement therewith in dotted lines. Fig. 3 is an elevation of the power from one end of the sweep, illustrating the different positions thereof. Fig. 4 is a detail in plan of the pivoted sweeper.

Referring to the accompanying drawings, A represents a stationary shaft fixedly secured at its lower end in the ground sill B, while the upper end thereof is held in position by means of the brace C, extending to one side of the barn, in which the power is adapted to be used, particularly for hay elevating purposes.

Loosely mounted upon the shaft A, a short distance above the ground is the rope reel or drum D, around which is adapted to wind and unwind the elevating rope D', which is held in position on the reel by the horizontal projecting flanges E, thereof. The rope D, passes through an adjacent guide box E', which leads the same from the pulley F at the front of the barn, beyond which the said rope is adapted to be connected to the hay elevator used over the mow, as is usual, or with other elevating devices to which the power may be applied.

Loosely mounted upon the shaft A, above the reel, or drum B, is a square collar G, which carries the pivoted automatically tripping sweep lever H. The said sweep lever H, is of sufficient length so that the draft animal can be hitched to one end of the same in order to operate the reel or drum D, and the same is provided near the inner end thereof with the squared opening I, somewhat larger than the square collar G, in order to fit over the same and work loosely thereon, being pivoted thereto by means of the pivot pin or bolt J. To the extreme end of the lever H, adjacent to the vertical shaft A, is secured the depending fixed arm or pawl wire K, which is adapted to engage and disengage the beveled ratchet lugs L, secured to the top of the reel or drum near its outer edge, so that when the horse is in motion said fixed pawl or arm will engage behind the nearest lug thereto to turn the reel or drum, but when the animal is stopped, the weight of the long end of the lever is to be sufficient, to raise the inner end thereof, and the fixed arm or pawl above the plane of said lugs to automatically release the lever from the reel, so that the latter can turn back without the backing of the draft animal.

Spaced above the lever H, by the spacing sleeve M, is the upper horizontal lever supporting arm N. The said lever supporting arm N, is loosely connected at its inner end to the shaft A, so as to be free to revolve thereon with the sweep or lever H, and said arm N, is braced in its horizontal position by means of a diagonal brace wire or rod O, secured to the under side thereof and the loose spool M. Loosely connected at its ends at P, to the outer end of the horizontal arm N, and to the top of the lever H, intermediate of its ends, is the swinging connecting or lever-supporting rod Q, which is designed to hold the lever H, in and out of engagement with the reel or drum D. Now, it will be readily seen that when the draft animal is started to operate the wheel to draw in the rope D', the outer lowered end of the sweep lever H, will move in advance of the upper horizontal supporting arm N, inasmuch as there is a loose connection there-between. The long end of said lever continues to move, while at the same time the connecting rod Q, will lift the same until the said rod has assumed a position at an angle to both the lever and the arm, and will therefore cause the latter to move with the sweep. This movement lowers the inner end of the lever until the fixed arm or pawl wire K, is lowered into engagement with one of the ratchet lugs L, and thereby causes the reel or drum to rotate and wind up the rope thereon. To release the reel or drum from the operating lever, in order to pay out the rope, it is only necessary to stop the draft animal, which will relieve the lever from the draft and allow the long weighted end of the same to lower and raise the pawl end thereof, out of the path of the ratchet lugs of the reel or drum.

The many advantages and utility of this construction will readily suggest themselves to those skilled in the art.

Having thus described my invention, what I claim as new and desire to secure by Letters Patent is:—

1. In a horse power, a stationary vertical shaft, a wheel loosely mounted at the lower end of said shaft and provided with catch lugs, a pivotally mounted sweep lever loosely working over the shaft above said wheel and adapted to automatically engage and disengage said lugs at one end, and a swinging rod support for the long end of said lever, substantially as set forth.

2. In a horse power, the combination of a stationary vertical shaft, a flanged wheel or drum loosely mounted on said shaft and provided with ratchet lugs upon its top side, a collar loosely working on the shaft above the reel or drum, a weighted sweep lever pivoted to said collar and having an inner pawl end adapted to automatically engage and disengage said lugs and a swinging rod support for the long end of the lever, substantially as set forth.

3. In a horse power, a stationary shaft, a horizontal reel or drum loosely mounted upon said shaft and provided upon its top face with a series of ratchet lugs, a collar loosely working on the said shaft over said reel or drum, a weighted sweep-lever pivoted to said collar and provided with a fixed pawl at one end adapted to be automatically thrown in and out of the path of the lugs, a supporting arm loosely supported on the shaft above said lever, and a swinging connection loosely connecting the arm and said lever, substantially as set forth.

4. In a horse power, a stationary vertical shaft, a horizontal reel or drum loosely mounted on said shaft and provided with ratchet lugs, a collar loosely working on the shaft over the reel or drum, a weighted sweep-lever pivoted to and embracing said collar and provided with a fixed pawl at its inner end adapted to be automatically thrown in and out of the path of the lugs, a horizontal supporting arm loosely mounted on the shaft above the lever, a spacing sleeve interposed between the arm and lever and working loosely on said shaft, a diagonal brace rod connected to said horizontal arm and said spacing sleeve, and a swinging supporting rod loosely connected at its ends to said horizontal supporting arm and the sweep-lever, substantially as set forth.

In testimony that I claim the foregoing as my own I have hereto affixed my signature in the presence of two witnesses.

EMMETT H. CONDIT.

Witnesses:
  A. J. SMITH,
  H. T. SIBEL.